United States Patent [19]
Schmitt

[11] Patent Number: 5,413,721
[45] Date of Patent: May 9, 1995

[54] BACKFLUSH FILTER SYSTEM FOR DOWNHOLE PUMPS

[75] Inventor: Kenneth J. Schmitt, Spring, Tex.

[73] Assignee: Stren Company, Houston, Tex.

[21] Appl. No.: 100,612

[22] Filed: Jul. 30, 1993

[51] Int. Cl.$^6$ ............................................. B01D 29/66
[52] U.S. Cl. ..................................... 270/747; 210/108; 210/170; 210/411; 210/416.5; 210/791
[58] Field of Search .................. 166/68, 105, 227, 228, 166/236, 369, 90; 210/108, 170, 321.69, 411, 636, 741, 791, 747, 739, 136, 416.1, 416.5, 497.01

[56] References Cited

U.S. PATENT DOCUMENTS

| | | | |
|---|---|---|---|
| 2,046,770 | 7/1936 | Coberly | 210/108 |
| 2,049,304 | 7/1936 | Lloyd | 210/108 |
| 2,646,126 | 7/1953 | Goodner | 210/411 |
| 3,973,630 | 8/1976 | Wheeler et al. | 166/312 |
| 4,273,192 | 6/1981 | Saadeh et al. | 210/108 |
| 4,478,285 | 10/1984 | Caldwell | 166/311 |
| 4,621,693 | 11/1986 | Caldwell et al. | 166/311 |
| 4,778,355 | 10/1988 | Holland | 417/378 |
| 4,940,092 | 7/1990 | Ferguson et al. | 166/311 |
| 4,969,518 | 11/1990 | Schmitt et al. | 166/228 |
| 5,042,149 | 8/1991 | Holland | 29/888 |

OTHER PUBLICATIONS

Spears Specialty Oil tools, Inc.; *Backwash Valve*; (4 pg.), undated.

*Primary Examiner*—Joseph W. Drodge
*Attorney, Agent, or Firm*—Conley, Rose & Tayon

[57] ABSTRACT

A filter assembly for filtering particulate matter from well fluids to be pumped by a downhole pump in an oil well including a filter and apparatus to reverse the flow through the filter in response to a pre-selected level of differential pressure across the filter, the apparatus including a check valve which opens to allow fluid to flow through to operate a piston to open a pump valve and allow fluid flow out of the pump.

18 Claims, 3 Drawing Sheets

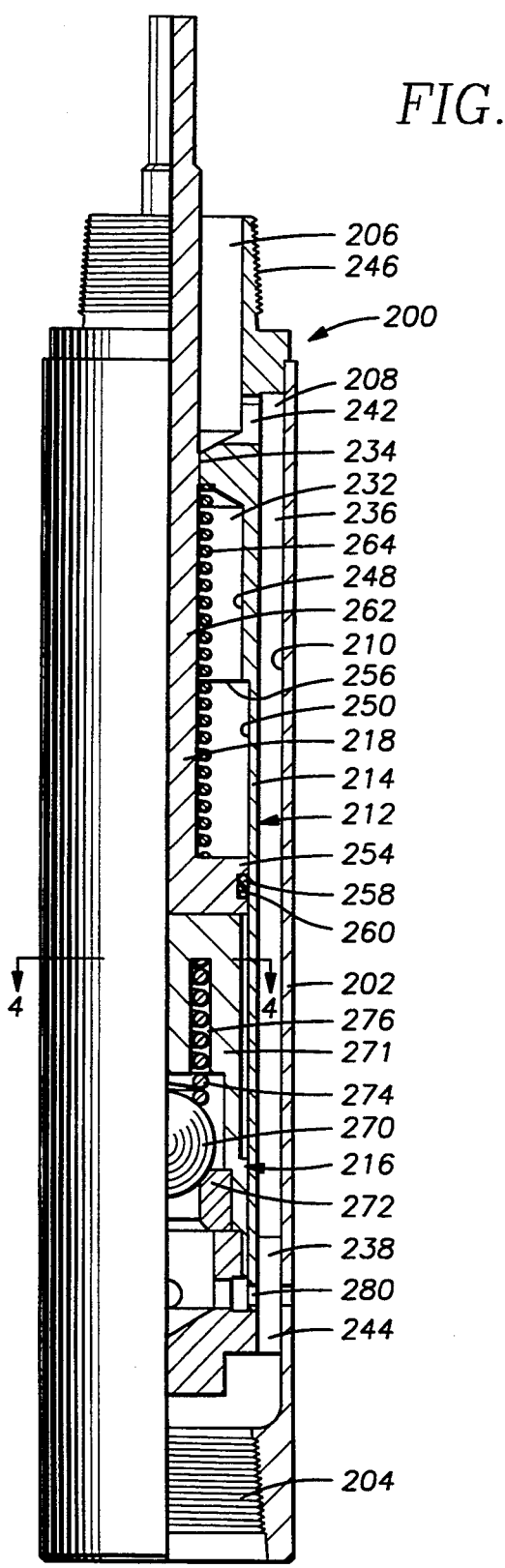
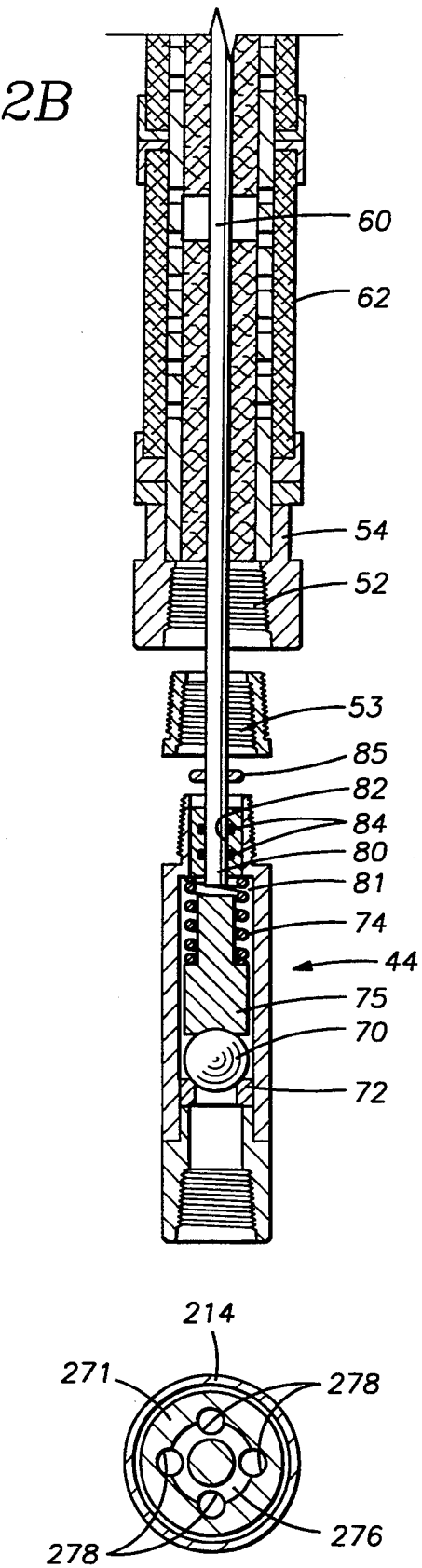
FIG. 2B
FIG. 3
FIG. 4

BACKFLUSH FILTER SYSTEM FOR DOWNHOLE PUMPS

BACKGROUND OF THE INVENTION

The present invention relates to the field of pumping of oil well fluids from a downhole location in an oil well to the surface adjacent the well. More particularly, the invention relates to the protection of the pump from well bore solids that can abrade or jam the pump. More particularly still, the invention relates to the filtration of solids from the well bore fluid by filter media prior to the entry of the fluids into the pump, and the downhole cleaning of the filter media to limit the need to remove the pump and filter from the well bore to replace or clean the filter after the filter has restrained amounts of the solid particulates sufficient to reduce its capacity.

Downhole pumps are placed in well bores to pump well fluids from a location within the well bore upward to the surface. Such pumps provide the energy to lift the well fluid where the natural well pressure is too low to force the well fluid to the surface. One major consideration in the cost of producing oil from low production wells is the cost of lifting the well fluid to the surface. The lifting cost is a function of original equipment cost and the cost to run, and maintain or replace the equipment, and the cost to service the well and equipment. Pumping costs are a major contributor to production costs, and marginally producing wells are commonly abandoned because the overall cost of pumping, including equipment maintenance, is too high in comparison to the value of any oil produced from the well. This is particularly true where the well is pumping from a formation which gives up produced fluid with a high abrasive particulate content. These abrasives tend to migrate with the well fluid into the pump, and contribute to high pump wear and maintenance. As a result of the presence of these particulates, rapid abrasive damage can occur on the precision pump surfaces, particularly on the critical interface of the plunger with the barrel. Additionally, many other pump components, such as critical valves, abrade in the presence of the particulates, which leads to inadequate pump performance. As a result of this wear and damage, the pump must be pulled out of the well to be repaired or replaced. Removal and reinsertion of the pump may take several hours, or several days, at significant cost to the well operator. The more abrasive the well fluid, the more often the pump must be pulled for servicing and repair.

U.S. Pat. No. 4,969,518, Schmitt, et al., fully incorporated herein by reference, discloses a significant improvement in pump structure that permits a significant increase in pump downhole time, i.e., the length of time the pump remains in the hole pumping, before it must be removed for service. This improvement is provided by a filter member having tortuous paths therein that decrease in size from the well side to the pump side of the filter. Additionally, the filter includes a trip member that allows fluid to bypass the filter if the filter should become clogged while still in service. This filter provides substantial protection to the pump, and permits the pump to remain in the well bore for longer periods without service or replacement, and thus lowers the cost of pump maintenance, repair or replacement.

Despite the technological advance of the invention described in U.S. Pat. No. 4,969,518, there is still the need to pull the pump after the filter media capacity is reduced by becoming clogged, or loaded. For example, on a well in Wyoming with a history of requiring pump repair every 7 days, the filter media of the '518 patent increased the pump downhole time to 214 days. However, despite the tremendous decrease in lift cost associated with such an increase in downhole time, the pump still has to be removed for filter replacement and pump inspection/service. Thus, there exists a need to increase the efficiency of the filter media used in association with downhole pumps.

SUMMARY OF THE INVENTION

In accordance with the invention there is provided a downhole cleaner which, in cooperation with the pump, forces well bore particulates outwardly from the filter upon a preselected reduction in filter efficiency exhibited by a preselected pressure differential across the filter media of the filter, which cleans the filter in place in the well bore and permits continued use of the filter and pump without the need to pull the pump to clean or replace the filter.

In one embodiment, the protected pump is of the sucker rod type, which operates by moving a discrete column of well fluid, which is substantially equal to the volume of the pump bore, up the production tubing. The pump piston is pulled upward, typically by a sucker rod string that is connected to a jack on the surface, to move a column of well-fluid thereon into the production string. A filter is disposed over the pump inlet to filter out well bore particulates, and a control valve is located on the filter in communication with the pump inlet. When the filter reaches a pre-selected load factor, i.e., a pre-selected percentage of the filtering passages therethrough are blocked, which increases filter differential pressure and/or reduces the volume of well-bore fluids passing therethrough per unit of time, the control valve operates to cause the pump to reverse the flow of fluid through the filter, thus forcing a substantial portion of the accumulated well bore particulates out of the filter. The dislodged particulates may then settle to the bottom of the well-bore, removing them from interference with the well pumping. Additionally, through use of a commonly installed well monitoring device called a dynamometer, or pump off controller, one may augment the above action by purposely having the dynamometer well pumping controller sense the presence of back-flush action and shut off the pumping jack for a period of time sufficient to allow the dislodged particulates to settle to the bottom of the well bore below the well casing perforations, before restarting pumping.

In an alternative configuration, the downhole filter cleaner may actuate to bypass the pump, to allow the static head of well fluid above the pump to directly communicate with the filter to backflush the filter.

BRIEF DESCRIPTION OF THE DRAWINGS

These and other features and improvements will become apparent from the brief description of the preferred embodiment, when read in conjunction with the drawings, wherein:

FIG. 3 is a partial sectional view of an alternative embodiment of the self-cleaning filter; and FIG. 4 is a sectional view of the alternative embodiment of the self-cleaning filter of FIG. 3 at section 4—4.

BRIEF DESCRIPTION OF THE DRAWINGS

Figure 1:
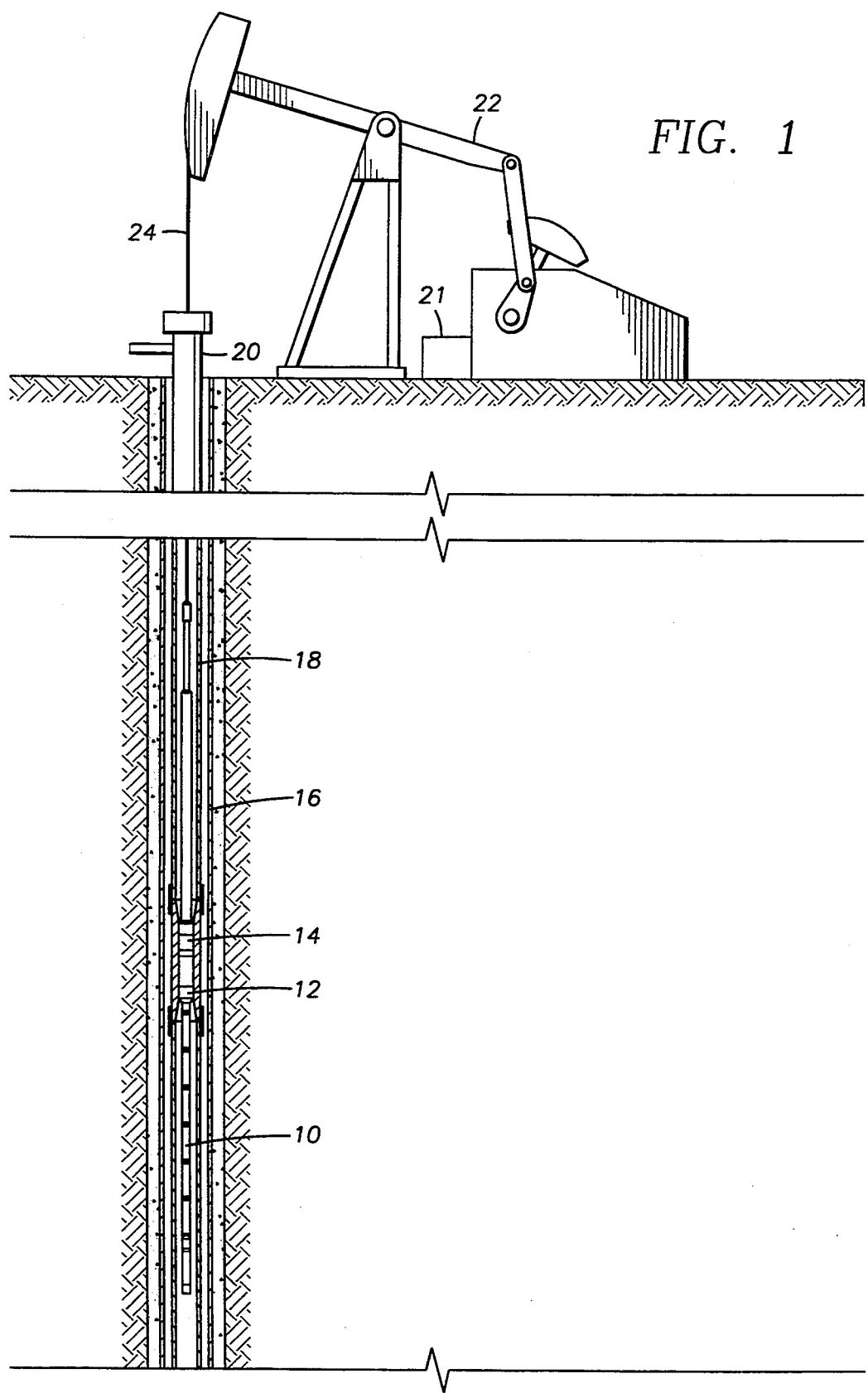
FIG. 1 is a vertical sectional view of a pump including the self-cleaning filter of the present invention installed thereon and located in the well tubing of a well bore.

Referring to FIG. 1, self-cleaning filter 10 of the present invention is disposed on the inlet 12 of a pump 14 suspended within the casing 16 of a well by a tubing 18. The upper end of tubing 18 is received in a head 20, which forms the upper terminus of the well. A pumping jack 22 is provided adjacent head 20, and includes a polish rod 24 suspended therefrom and through head 20 and down through tubing 18 where it connects to a sucker rod leading to the plunger 26 (shown in FIG. 2) of pump 14. Pumping jack 22 reciprocates polish rod 24 in tubing 18, and thus reciprocates plunger 26 within pump 14, to induce well fluids into pump inlet 12 to be pumped upward through tubing 18.

Figure 2A:
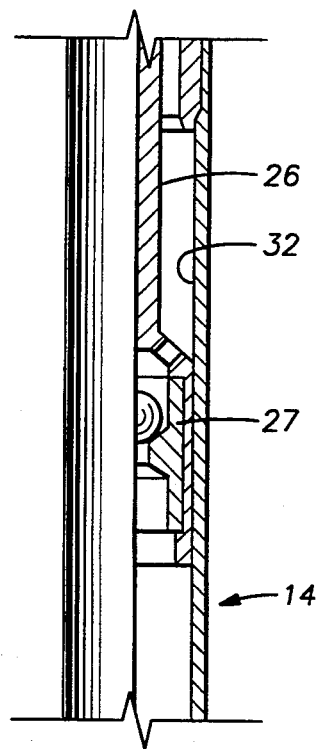
FIG. 2 is an enlarged sectional view of the self-cleaning filter of FIG. 1 during pumping operations.
Figure 2A:
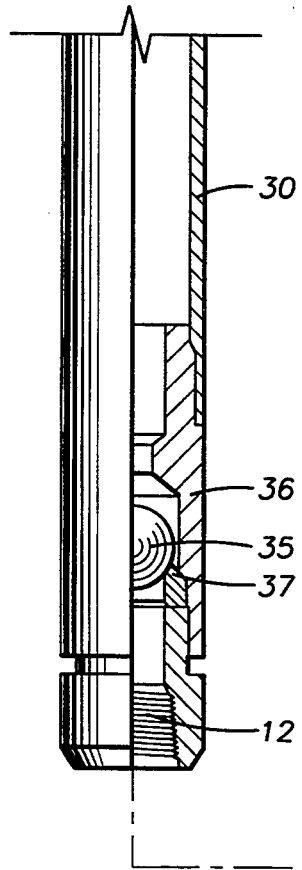
Figure 2A:
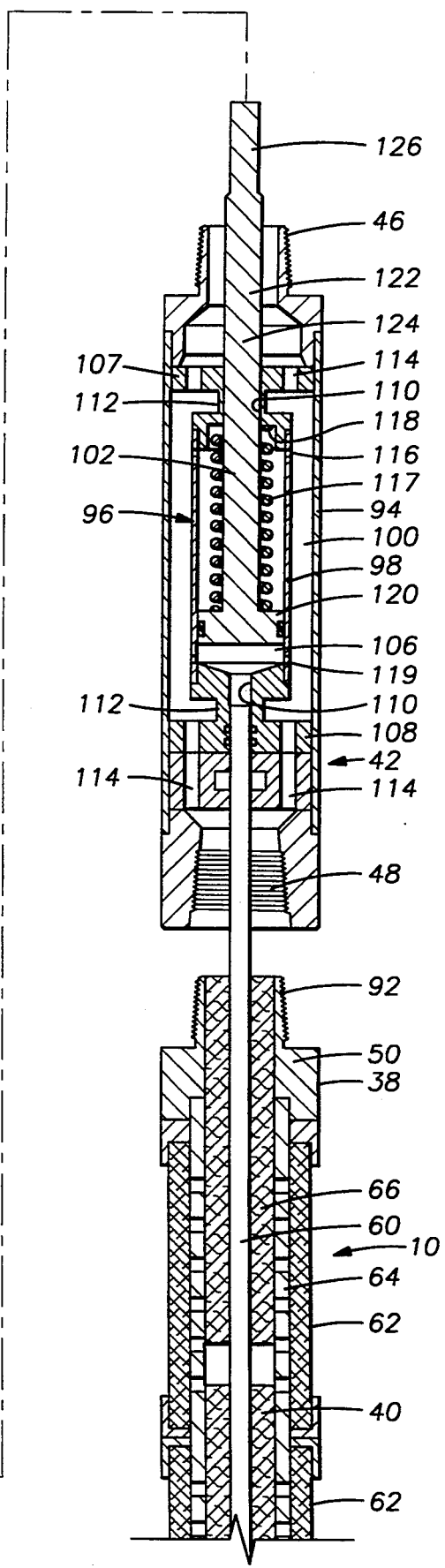

Referring now to FIG. 2, one typical configuration pump 14 includes an annular barrel 30, which forms the outer wall of the pump and the inner piston bore 32 of the pump, a valved plunger 26 within bore 32 and a lower standing valve 36 disposed over inlet 12. Lower valve 36 is typically a gravity-biased ball valve having a ball 35 disposed on a seat 37, and is disposed over the upper end of inlet 12. Plunger 26 includes a travelling valve 27 therein, which is preferably a ball and seat valve. When plunger 26 is pulled upward by jack 22, travelling valve 27 closes, and ball 35 moves off seat 37 in valve 36. With the travelling valve closed, plunger 26 pushes the well fluid above plunger 26 upwardly out of pump bore 32 and well fluid passes through inlet 12 through open valve 36 into pump bore 32 below plunger 26. When plunger 26 reaches the upper terminus of bore 32, jack 22 reverses the travel of polish rod 24 and thus reverses the travel of plunger 26 in bore. Ball 35 in valve 36 closes on seat 37 in response to this change in plunger 26 direction, while traveling valve 27 opens and plunger 26 moves downward in barrel 30 as the well fluid captured in pump barrel 32 passes through travelling valve 27, until plunger 26 is positioned adjacent lower valve 36 to begin the next pumping, or lift cycle. During downward movements of plunger 26, the pressure in the well fluid below plunger 26 will exceed that above plunger 26, as the weight of the rod string 24 and static head of the pumped fluid above plunger 26 push plunger 26 downward to pressurize the fluid within barrel 30 captured by standing valve 36, which pressure opens traveling valve 27, until the plunger 26 is positioned adjacent standing valve 36. This cycle continuously repeats, sending a discrete column of well fluid into the tubing 18 during each cycle.

Filter 10 is disposed over inlet 12 of pump 14 to trap sand and other abrasive particulates as the well fluid passes therethrough and into pump inlet 12. Filter 10 includes a housing 38 supporting a filter portion 40 therein, and an upper control valve 42 and lower control valve 44 disposed on either end thereof. Upper control valve 42 includes a nipple portion 46 that is received in pump inlet 12, and a lower threaded female aperture 48 to receive the upper end 50 of housing 38 therein. Housing 38 also includes a threaded aperture 52 on lower end 54 thereof, into which lower control valve 44 is received. A secondary threaded sleeve 53 may be located between aperture 52 and lower control valve 44. A control tube 60 is disposed through the center of housing 38 and interconnects upper control valve 42 and lower control valve 44.

Referring still to FIG. 2, housing 38 is constructed of one or more annular permeable filtering member cartridges 62 forming the outer cylindrical wall thereof and perforated longitudinal inner annular member support mandrel 64 disposed therein, which surrounds an annulus, or inner bore 66, for receipt of a filter portion 40 between mandrel 64 and control tube 60. A plurality of outer members 62, and support mandrels 64 may be connected end to end to supply the necessary filter area for the application. The inner diametrical space of mandrel 64 forms an inner annular portion 66 for passage of well fluid therethrough into inlet 12 and for the receipt of control tube 60 therethrough. The construction and arrangement of filter portions 40 can be varied to suit particular well fluid characteristics. In the preferred embodiment, filter portion 40 is a precision, stainless wire wrapped, perforated core which, through subsequent processing and metallurgical fusing creates a rugged highly permeable precision tubular membrane. This precision membrane possesses many desirable qualities for the application including low well fluid passage pressure drop across a broad range of viscosities encountered in petroleum production wells. This filter membrane also performs efficiently with regard to its release of the built up particulates upon back flush cycling. The commercially available embodiment of this preferred filter media membrane is sold by Stren Company of Houston, Texas under its trademark "PumpGard", "HiFlo Precision Stainless Steel Cartridge System." These cartridges presently are in use in PumpGard TM tools sold by the aforementioned Stren Company in successful service to the petroleum production industry. They are presently being serviced, when they become loaded and require retrieval from the well for cleaning, by washing them off, commonly with a pressure washer water spray at the pump repair shop. This precision stainless cartridge type may be preferably used with or without an outer perforated protective sleeve, such as sleeve 62, placed over the precision membrane. These cartridges are standardly available in filtration ratings of 25 and 50 microns, and may be additionally manufactured at a broad range of micron ratings, as may be desirably employed for the range of well fluid conditions to be pumped. Filter portions 40 could also be media bodies having small tortuous passages therethrough having a nominal size of about 0.0004 inches, which narrow as they pass through the portions 40 from the outer diameter of the annular sleeve to the inner annular diameter. Filter portion 40 material in this configuration can be a casting of acrylic fibers impregnated with phenolic resin, with the passages formed therein formed randomly therein during casting. One media suitable for filter portion 40 is sold by Cuno, Inc. of Meridian, Connecticut and identified by the registered trademark "Micro-Klean." Filter portion 40 may include grooves cut therein to increase the number of passages extending through filter portion 40. Other filtering media, including screening, may be used. Tubular screens of the "V-Wire" and other profile wire types as sold by Johnson Filtration Systems, Inc. of St. Paul, Minnesota, and other brands may be used as may be desirable under certain conditions.

During pumping operations, well fluid passes through outer annular member cartridges 62, through filter portion thereof 40 where particulates are removed from the well fluid, through inner annular member 64 and into inner bore 66. Depending on the filter media type and the characteristics of the well head, the particles are trapped in the media 40 or accumulated on the surface thereof. The fluid then moves through upper control valve 42 and into pump 14 through inlet 12. As pumping continues, the filter portion 40 loads with solid particulates and materials, which causes the pressure in bore 66 to decrease significantly with respect to the pressure in the well bore.

Upper control valve 42 and lower control valve 44 are shown disposed on the opposed ends of filter portion 40 interconnected by control tube 60 disposed through bore 66. When the filter portion 40 is loaded to a preselected level as exhibited by a growing relative pressure differential, the lower control valve 44 actuates to cause pressure within control tube 60 to increase, and thus move upper control valve 42 actuator piston to actuate ball 35 off seat 37 in lower valve 36 during a plunger 26 upstroke, and maintain ball 35 off seat during the plunger 26 downstroke. The well fluid in pump bore 32 is thus forced back into filter bore 68, and the well fluid in filter bore 66, plus a significant portion of volumetric displacement of the pump, is forced back out through filter portions 40 and outer annular member cartridges 62, ejecting accumulated particulate loading as it passes therethrough to clean the filter portions 40.

Lower control member 44 includes a spring-loaded ball valve having a ball 70 disposed on a seat 72 exposed to the well bore, and biased into seat by control spring 74 acting on ball guide 75, which selectively seals a control cavity 81 disposed inward of ball 70 and seat 72. Cavity 81 is maintained at a lower pressure than the well bore by ball 72 and seat 74 as filter portions 40 load. Spring 74 is selected to force ball 70 into seat 72 to prevent passage of well fluid past seat 72 while the filter remains unloaded or partially loaded. When the level of filter portion 40 loading reaches a preselected level, the pressure on the well bore side of seat 74 is sufficiently greater than that in cavity 81, that it will overcome the force of spring 74 on ball 72, and thus allow well fluid into cavity 81. The lower end 80 of control tube 60 is received in cavity 81 of lower control valve 44 through a seal bore 82 at the upper terminus of control valve 44. A plurality of o-ring seals 84 are provided about the periphery of control tube 60 in seal bore 82 to seal the interface between control cavity 81 and filter bore 68, and a cap 85 is provided about the periphery of tube 60 adjacent the entrance thereof into lower control member 44.

Upper control valve 42 is disposed intermediate pump inlet 12 and filter member 40 and includes a lower threaded inlet portion 48 into which the upper end 50 of filter housing 38 is received, an upper male threaded nipple 46 portion that is received into pump inlet 12, and an outer cylindrical housing 94 having valve deseating apparatus 96 disposed therein. Deseating apparatus 96 includes a barrel 98 received inward of cylindrical housing 94, which forms a flow annulus 100 between barrel 98 and housing 94, a ball deseating actuator 102 disposed in the upper portion of barrel 98 and extending upward and outward therefrom, and a control chamber 106 disposed in barrel 98 below deseating actuator 102 which receives the upper end of control tube 60 therein. Control chamber 106 controls the actuation of deseating apparatus to selectively open lower valve 36 in pump 14, to allow downward movement of plunger 26 to force well fluid back through filter member 40 to clean filter member 40.

Deseating apparatus 96 includes the aforementioned barrel 98, which is supported within upper control member housing 94 by an upper support 107 and a lower support 108, which are rigidly secured against the internal surface of barrel 98 and housing 94. Supports 107, 108 are preferably right circular members, that include a central bore 110 therethrough in the center of a projecting portion 112 thereof and a plurality of longitudinal well fluid passages 114 disposed about the center thereof. Extending portions 112 of each support 107, 108 are attached to the ends of barrel 98, to support barrel 98 in the approximate center of housing 94 and thus form annulus 100 between housing 94 and barrel 98. Passages 114 register with annulus 100, such that fluid may flow past barrel housing 98 by passing through passages 114 and annulus 100. Barrel 98 further includes a plurality of bleed passages 116 in the upper end thereof, which are in communication with annulus 100.

Deseating apparatus 96 is partially disposed in housing 98 and extends outwardly through central bore 110 in upper support, and includes deseating actuator 102 biased downwardly in barrel 98 by spring 117. The upper, inner, portion of housing 98 forms a spring bearing surface 118. The lower end of deseating actuator includes a piston 120, on which is mounted an extending deseating rod 122. Rod 122 extends from piston 120 and out of housing through bore 110 and terminates adjacent standing valve 36 in pump 14. Spring 117 bears on bearing surface 118 and the upper surface of piston 120 about rod 122, to bias piston 120, and rod 122 thereon, downwardly in barrel 98. Rod 122 includes a seal portion 124, which is the major diameter portion of rod 122 received in aperture 110 in upper support 107, and a reduced diameter ball engaging portion 126 on the end thereof extending out of housing 96 and disposed adjacent standing valve 36.

To communicate fluid pressure between lower control member 44 and upper control valve 42, the upper end of tube 60 is received in lower support 108 and a plurality of seal ring grooves having seal rings therein, are disposed in lower support 108 to seal against tube 60. The area of barrel 98 between the lower face of piston 120 and the upper end of tube 60 forms control chamber 106. The lower end of barrel 98 possesses a plurality of bleed orifices 119 that communicate between control chamber 106 and flow annulus 100. These orifices serve to meter the rate of fluid release from under the piston, thereby determining the rate at which actuator 122 releases ball of standing valve 36. Alternatively, the bleed orifices may take the form of ports cut as grooves into the seat of ball 70 and seat 72 of lower control member 44, or other means of allowing the controlled passage of high pressure fluid out of control chamber 106. Orifices 119 are sized by considering factors including the exerted force of ball 35 on actuator rod 122 and thereby piston 120 during backflush, the spring constant of spring 117, the size of piston 120 and the expected pressure differential between annulus 100 and control chamber 106 for a given application.

When filter 10 is originally placed in the well, filter portion 40 preferably has zero loading, corresponding to an unused filter. The placement of the unused, or clean, filter into the collected well fluid at the production zone causes fluid to pass through the filter portion 40 and into the bore 68 thereof adjacent tube 60. Movement of the plunger 26 in pump bore 32 moves a discrete amount of fluid through filter threaded portion 92 and flow annulus 100, then through pump inlet 12 and past standing valve 36 into pump bore 32 to be pumped to the surface. The pressure drop across a clean filter portion 40 is typically on the order of less than 5 PSI.

As the filter portion 40 continues to filter out particles from the well fluid, the pressure drop will increase across the filter portion 40, which increase depends upon the concentration and characteristics of the particulates being controlled, and the efficiency of filter portion 40 in handling the specific size and nature of particulates being restrained on filter portions 40. At a certain point of loading, the amount of pressure required to move available well fluid through filter portions 40 becomes a limiting factor as a result of the particulate loading of the filter media. At this point, denominated as a fully loaded situation, the pressure drop across the filter is then at its highest designated limit, determined by spring strength chosen and installed in valve 44. For any filter configuration, the pressure drop across the fully loaded filter, at each level of loading, can be determined.

The present invention backflushes the filter portion 40 when it is fully loaded. Control spring 74 in lower control member 44 is selected such that in the non-fully loaded condition, the force of spring 74, and the pressure inside control cavity 81 on ball 70, is greater than the pressure of the well fluid bearing upon the exposed portion of ball 70 in seat 72 of lower control member 44, and spring 74, thus maintains ball 70 in seat 72. However, when the pressure drop across filter member 40, and thus across ball 70 in seat 72, reaches that of a fully loaded filter member 40, the well fluid pressure overcomes the force of spring 74 and internal pressure acting on ball 70, and thus moves ball 70 off seat 72.

The movement of ball 70 off seat 72 causes an immediate precipitous pressure increase equal to the pressure drop across the filter portion 40, in tube 60 and thus into control chamber 106 against piston 120 in deseating apparatus 96. This high pressure pushes piston 120 upward against spring 117 in housing 98, thus moving the reduced diameter ball engaging portion 126 of rod 122 into lower valve 36 to move ball 35 off seat 37. The fluid behind piston 120 within upper portion of barrel 98 moves outwardly from housing 98 through bleed passages 116 to permit piston 120 to move upwardly in housing 98 in response to the high pressure surge in chamber 106. Once piston 120 has fully moved upwardly in housing 98, the pressure within chamber 106, tube 60 and lower control member 44 equalizes with the well bore pressure, and spring 74 biases ball 70 back on seat 72 in lower control member 44. At the same time, due to the back flush of filter members 40, the pressure therein may begin to dissipate by equalization through bleed orifices 119 and bleed passages 116. However, the time required to cause equalization, which allows spring 117, in combination with forces exerted on piston 120 through rod 122, to force piston 120 down to allow ball 35 to return to seat 37 in standing valve 36, is typically substantially greater than the cycle time of pump 14 and is established by sizing of bleed orifices 119.

The actuation of ball engaging portion 126 to move ball 35 off seat 37 in standing valve 36 maintains standing valve 36 open as the pump 14 continues to operate. Plunger 26 moves back downward in pump housing 30, with a higher pressure above plunger 26 than below as fluid in bore 30 is allowed to escape out of inlet 12. Because the pressure above plunger 26 exceeds that below plunger 26, travelling valve 27 will remain closed, forcing all of the fluid within the pump back through inlet 12 and annulus 100 to displace the fluid within filter bore 68 back through filter media 40, and thus clean filter media 40 by backflushing out trapped particulates lodged thereon and/or therein.

In one manner of operation, pumping jack 22 is, or can be, provided with a tripping device called a pump-off control or pumping monitor (not shown), which can be set to shut off jack 22 for a short, timed, period if a pumping irregularity occurs. The opening of the standing valve 26 creates a low, or no, resistance downstroke of jack 22, which is detected by the monitor to shut the jack 22 down for a preselected period of time. Thus, once a backflush occurs, the pump 14 will stop operating for five, ten or other prescribed number of minutes. During this period, pressure inside of tube 60 and chamber 106 will equalize through bleed orifices 119, with that of the inside of filter bore 68 and annulus 100, which causes spring 117 to push piston 120 downwardly in barrel 98 and thus pull deseating rod 122 out of standing valve 36 to reseat ball 35 on seat 37 therein. The duration of time during which the jack is shut down allows the particulate ejected from the filter member 40 to settle in the well bore to an area below the filter, perhaps desiredly below casing perforations, and thus out of range to be pulled back into filter member 40 when pumping is reinstated. When jack 22 reinitiates pumping, filter member 40 is relatively clean, and begins loading again. It is contemplated that with the use of the backflushing cleaner, the pump and filter may remain in the hole for vastly extended periods of service compared to the present industry experience in abrasive laden production, and backflushing to clean the filer will occur whenever the filter loads to the predetermined level as determined by the pressure drop across the filter. This eliminates the need to regularly service the filter, while allowing constant, uninterrupted, long-term filtration of particulates before they reach the pump.

Referring to FIGS. 3 and 4, an alternative embodiment of the backflushing cleaner is shown. In this embodiment, upper and lower control members 42, 44 and tube 60 are replaced with a single, integrated actuator 200 disposed between filter 10 and pump inlet 12. In this embodiment, the lower end of pump filter 10 is sealed.

Actuator 200 includes a housing 202 having lower threaded opening 204 to receive upper end 50 of filter 10, an upper aperture 206 that is connected to pump inlet 12 for passage of filtered well fluid to pump inlet 12, and a central bore 208 formed on the interior wall 210 of housing 202. A backflush apparatus 212 is received in housing 202 and includes a barrel portion 214 that extends inwardly from upper aperture 206, a pressure-sensitive valve portion 216 disposed in barrel portion 214, and a piston and rod assembly 218 partially received in, and partially extending from, barrel 214. Barrel 214 is a cylindrical member that includes upper end member 206, which includes an outer male threaded portion 246 disposed thereon for engagement into the threads on inlet 12, a piston bore 232 extending therefrom downward to the lower end 244 thereof, and an actuator rod beating bore 234 disposed at the upper end thereof adjacent male threaded portion 246. Piston bore 232 includes an upper reduced diameter bore 248 and a lower piston bore 250, and an annular ledge interconnecting bores 248, 250 forms an annular stop 256. Filter 10 is received in lower aperture 204 of actuator.

Barrel 214 is disposed radially inward of housing 202, and forms an annular passageway or flow annulus 236 between housing 202 and actuator assembly barrel 214. Barrel 214 is held in position within housing 202 by upper end member 206 fitted over the upper end of housing 202, and by lower extending vane sections 238 which are formed as radial extensions of barrel 214 at its end 244 inward housing 202. Vane section 238 extends radially from barrel 214 to contact the inner surface of housing 202, and the spaces between vane sections allow passage of well fluid therethrough. Upper end member 206 of housing 202 forms the upper terminus of flow annulus 236 within housing. To interconnect flow annulus 236 to upper male threaded portion bore 246 and thus to pump inlet 12, and to lower aperture 204 and thus filter 40, a plurality of radial passages 242 are provided through upper end member 206.

Piston and rod assembly 218 includes a generally right circular piston 254 having an outer cylindrical wall with a seal ring 258 disposed in a groove 260 of piston, and a rod 262 extending from one face thereof. Piston 254 is received in control piston bore 250, and rod 262 extends upwardly from piston and outwardly from barrel 214 through bearing bore 234. A plurality of bleed ports 255 are provided at the upper end of barrel 214 which communicate piston bore 250 above piston 254 with annulus 236, permitting fluid above piston 254 to escape from bore 250 as piston 254 is moved upwardly. Piston 254 may move within control piston bore 250, but upward travel is limited by the engagement or piston 254 against stop 256. A spring 264 is disposed about rod 262 and bears against extending rod bearing bore portion 234 and piston 254 to bias piston 254 downwardly within barrel 214.

Pressure sensitive valve portion 216 is received over the lower end of housing 202 adjacent vane portion 238, and is configured to selectively pass high pressure well fluid to the underside of piston 254 when the preselected loading or filter member 40 has occurred. Valve portion 216 includes a valve housing 271, a ball 270 received over seat 272 and biased thereon by spring 274 which is received in a right annular depression 276 in housing 271. A plurality of fluid passage bores 278 communicate fluid pressure from the area of housing 271 adjacent spring 274 to the piston 254. A cross bore 280 is provided through housing 271 below ball 270, and through housing 202, to communicate well bore pressure to the underside of ball 270.

Actuator 200 takes the place of upper control member 42, lower control member 44 and control tube 60, but operates in substantially the same manner. During pumping operations, well fluid passes through filter 40, through flow annulus 236 and passageway 206 in actuator 200, and then into pump inlet 12. The passage or well fluid through filter filter 40 loads filter, and over time the pressure within filter member 40 is substantially less than that in the well bore. When a predetermined pressure differential across filter member 40 is reached, the force of the well fluid acting upon ball 270 exposed through seat 272 pushes ball 270 off seat 272, thus exposing piston 254 to well pressure. This pressure causes piston 254 to travel upwardly in bore 250 until piston 254 engages stop 256, which positions the upper end of rod 262 through standing valve 36 and thus maintains standing valve 36 open during one or more of the next pump 14 downstrokes to backflush the filter 40. Additionally, after backflushing occurs, pumping jack 22 can, if desired and so equipped, trip, which allows the particulates ejected from the filter to settle in the well bore. The back flush allows pressure equalization across filter member 40, and spring 264 forces piston 254 back down in bore 250 to pull rod 262 out of standing valve 36, thus allowing pumping through pump 14 when jack 22 continues, or again begins moving.

Although the invention has been described in conjunction with a sucker rod type pump, a backflushing mechanism may be used with other types of pumps, to force well fluids back through the filter. Additionally, it is contemplated that the mechanism of the present invention could be used to open a bypass line around the pump, and allow the static head of the well fluid to pass down through the filter media without additional energy of the pump.

Although preferred embodiments of the invention have been described, those skilled in the art will recognize that the apparatus may be modified without deviating from the spirit and scope of the invention. For example, the location of the actuator may be moved with respect to the filter, or may be located on or as an integral feature of the pump and/or filter. The filter member may be any type of filter member which, over time, loads with particulates which can be ejected or removed therefrom by backflushing.

I claim:

1. A filter assembly configured and arranged for filtering particulate matter from well fluid to be pumped by a downhole pump in a well, said pump including an inlet valve, including:
    a filter member positioned to filter particulate material from well fluid before the well fluid enters the pump, and
    an actuator including an opening rod operable in response to a pressure differential across the filter member resulting from a preselected level of particulate loading of the filter member, to engage said valve to open it to allow well fluid to flow from the pump through said filter member in a direction to dislodge particulate matter from said filter member.

2. The filter assembly of claim 1, wherein said opening rod is interconnected to a drive piston, and said actuator includes a pressure differential actuated member which selectively supplies a differential pressure to said piston, to move said piston to move said opening rod into interfering engagement with said valve when said filter member attains the preselected particulate loading.

3. The filter assembly of claim 2, wherein said pressure differential actuated member is a control valve which supplies well bore pressure against said piston, to move said piston to move said opening rod into interfering engagement with said inlet valve when said filter member attains the preselected particulate loading.

4. The filter assembly of claim 3, wherein said control valve is disposed intermediate said filter member and said pump.

5. The filter assembly of claim 3, wherein said control valve is disposed at one end of the filter member, and said piston is disposed at the opposite end of said filter member.

6. The filter assembly of claim 5, wherein said piston is disposed intermediate said pump and said filter member.

7. The filter assembly of claim 5, wherein a tube passes through said filter member to communicate said control valve with said piston.

8. A filter assembly configured and arranged for filtering particulate matter from well fluid to be pumped by a downhole pump in a well, including:
   a filter member positioned to filter particulate material from well fluid before the well fluid enters the pump,
   an actuator located within said well and operable in response to a preselected level of particulate loading of the filter member, positioned to allow well fluid in the well above the filter member to flow through said filter member in a direction to dislodge particulate matter from said filter member.

9. A filter assembly as defined by claim 8, wherein said actuator is operated by the pressure differential across the filter member which exists during pump operation.

10. A filter assembly as defined by claim 9, wherein said pump includes an inlet valve and said actuator includes:
   a spring loaded check valve positioned for exposure to pressure of well bore fluid on one side and pressure of well fluid flowing out of the filter member on the other side, the spring being selected to allow opening of the check valve when the pressure differential across the check valve indicates the preselected loading of the filter member, whereby well fluid can flow through the check valve;
   a fluid cylinder including a fluid operable piston therein;
   a conduit providing communication between the check valve and the fluid cylinder, and
   an elongated member extending from the piston in a direction for engagement with the pump inlet valve to engage the pump inlet valve to open it when the check valve is opened.

11. An oil well pumping system comprising
   a downhole pump having an elongate pump barrel open at its lower end with a standing valve positioned to close said opening to prevent flow downwardly therethrough, and a plunger in said barrel, said plunger having a traveling valve therein and being reciprocable in said barrel to pump well fluids from said barrel;
   an annular filter suspended below said pump to filter particulate matter from the oil well fluids, with the exterior of the filter being exposed to well fluids in the oil well and the interior of said filter being in communication with the lower opening of said barrel to conduct well fluids which pass through said filter from the oil well to the lower opening of the barrel; and
   an actuator, actuable in response to a preselected level of particulate loading of the filter, positioned to allow well fluids above the filter to flow through said filter in a direction to dislodge particulate matter.

12. An oil well pumping system as defined by claim 11, wherein said actuator is actuated by the pressure differential across the filter produced by operation of the pump.

13. An oil well pumping system as defined by claim 12, wherein said actuator includes:
   a spring loaded check valve positioned for exposure to pressure of well bore fluid on one side and to pressure of well fluid flowing out of the filter on the other side, the spring being selected to allow opening of the check valve when the pressure differential across the check valve indicates the preselected loading of the filter, whereby well fluid can flow through the check valve;
   a fluid cylinder including a fluid operable piston therein;
   a conduit providing communication between the check valve and the fluid cylinder, and
   an elongated member extending from the piston in a direction for engagement with the standing valve to open it when the check valve is opened.

14. A method for filtering particulate matter from well fluid being pumped from an oil well by a downhole pump, comprising
   operating a downhole pump to cause well fluid to flow from a lower location in a well bore to a higher location in a well bore,
   causing said well fluid to flow through a filter while flowing from said lower location to said higher location so that the filter becomes loaded with particulate matter, creating a differential pressure across the filter, and
   causing the well fluid to flow downwardly through the filter, in response to a preselected differential pressure across the filter acting on an actuator member within said well.

15. A method as defined by claim 14, wherein
   said differential pressure is applied across a spring loaded check valve positioned for exposure to pressure of well bore fluid on one side and pressure of well fluid flowing out of the filter member on the other side the spring being selected to allow opening of the check valve when the preselected pressure differential is created across the check valve, whereby well fluid can flow through the check valve;
   the well fluid passing through the check valve is conducted to a fluid cylinder including a fluid operable piston therein to move said piston to cause the well fluid to flow downwardly.

16. A method for pumping well fluids from an oil well comprising:
   installing in the oil well a downhole pump having an elongate pump barrel open at its lower end with a standing valve positioned to close said opening to prevent flow downwardly therethrough, and a plunger in said barrel, said plunger having a traveling valve therein and being reciprocable in said barrel to pump well fluids from said barrel;
   suspending beneath the pump an annular filter to filter particulate matter from the oil well fluids, with the exterior of the filter being exposed to well fluids in the oil well containing particulate matter and the interior of said filter being in communication with the lower opening of said barrel to conduct well fluids which pass through said filter from the oil well to the lower opening of the barrel;
   operating said pump to pump well fluids from the well bore through said filter, whereby particulate matter loads the filter to a preselected level; and
   in response to said preselected level of particulate loading of the filter, causing well fluids above the filter to flow through said filter in a direction to dislodge particulate matter.

17. A method as defined by claim 16, wherein said particulate loading causes a pressure differential across the filter, and the pressure differential is applied to open the standing valve of the pump to allow well fluids to flow downwardly and pass from the interior of the filter to the exterior of the filter.

18. A method as defined by claim 17, wherein
   the pressure differential is applied to a spring loaded check valve positioned for exposure to pressure of well bore fluids on one side and to pressure of well fluid in the interior of the filter on the other side, the spring being selected to allow opening of the check valve when the pressure differential across the check valve indicates the preselected loading of the filter, whereby well fluid flows through the check valve, and then to a fluid cylinder including a fluid operable piston therein, to cause the piston to move and open the standing valve of said pump when the check valve is opened.

* * * * *